United States Patent [19]

Carner, Jr.

[11] Patent Number: 4,932,765

[45] Date of Patent: Jun. 12, 1990

[54] OPTICAL DEVICE PROVIDING SUPPLEMENTAL WIDE ANGLE PERIPHERAL VISION

[76] Inventor: Donald C. Carner, Jr., 132 Eagle Rock Ave., Oxnard, Calif. 93035

[21] Appl. No.: 111,931

[22] Filed: Oct. 23, 1987

[51] Int. Cl.⁵ .................... G02B 25/04; G02B 27/10; G02B 17/08; G02B 23/06
[52] U.S. Cl. .................... 350/575; 350/174; 350/452
[58] Field of Search ............ 350/575, 174, 638, 453, 350/479, 452; 340/705

[56] References Cited

U.S. PATENT DOCUMENTS

| | | | |
|---|---|---|---|
| 737,844 | 9/1903 | Hubbard | 350/575 |
| 2,872,840 | 2/1959 | Stanton | 350/174 |
| 3,170,979 | 2/1965 | Baldwin et al. | 350/174 |
| 3,748,016 | 7/1973 | Rossire | 350/174 |
| 3,887,273 | 6/1975 | Griffiths | 350/174 |
| 3,910,676 | 10/1975 | Fojtik et al. | 350/575 |
| 3,936,605 | 2/1976 | Upton | 350/174 |
| 4,012,123 | 3/1977 | Fuller | 350/174 |
| 4,018,533 | 4/1977 | Haines | 350/174 |
| 4,181,405 | 1/1980 | Cohen | 350/174 |
| 4,523,808 | 6/1985 | Miller et al. | 350/575 |
| 4,722,101 | 2/1988 | Blower | 350/638 |
| 4,753,514 | 6/1988 | Kubik | 350/638 |

Primary Examiner—Jon W. Henry
Attorney, Agent, or Firm—Bernhard Kreten

[57] ABSTRACT

A field of vision enhancement device having a mounting on an article of headgear or other structure adjacent to the user, adjustable with respect to a straight ahead, normal line of sight including optics for displaying at least one field of optical information either normally occluded or not readily discernable with binocular vision whereby the field of vision is enhanced. The device may include additional graphic data presented to the user and superimposed on the enhanced peripheral view.

12 Claims, 4 Drawing Sheets

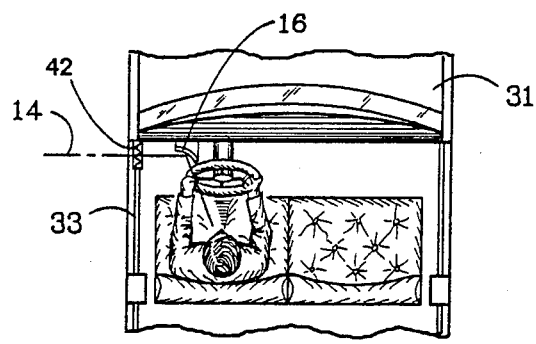
FIG. 17
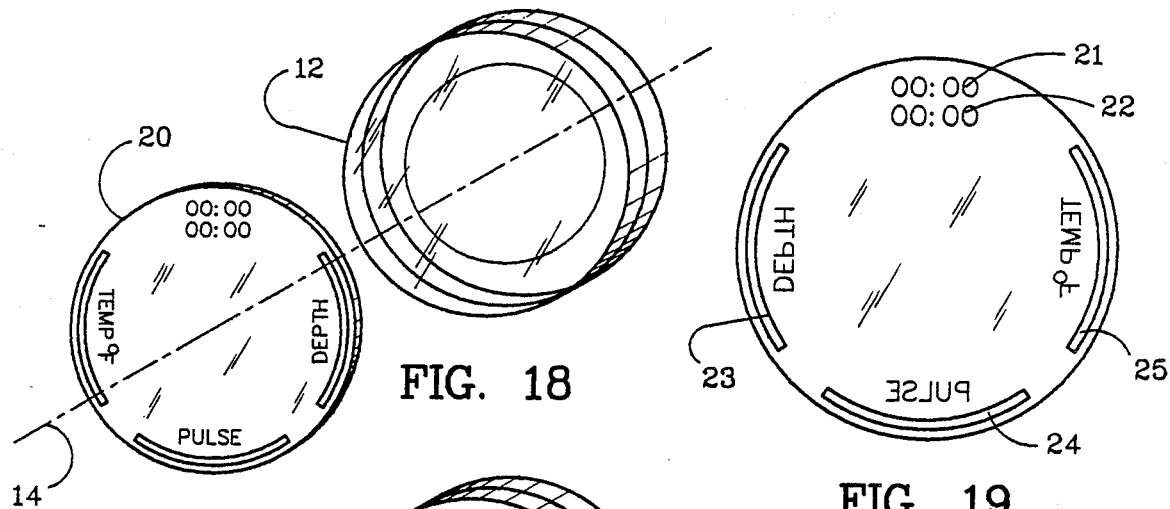
FIG. 18
FIG. 19
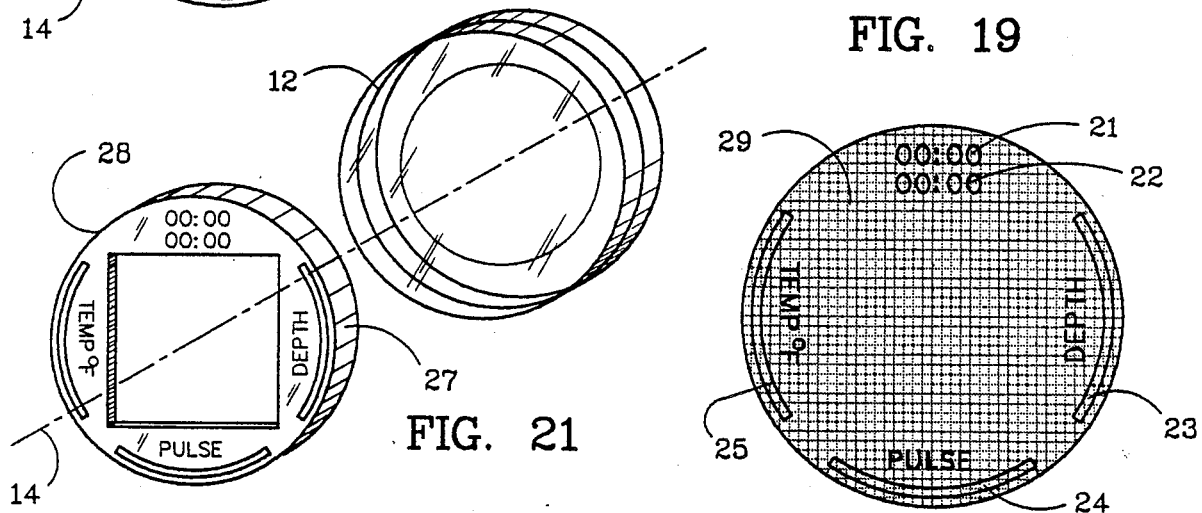
FIG. 21
FIG. 20
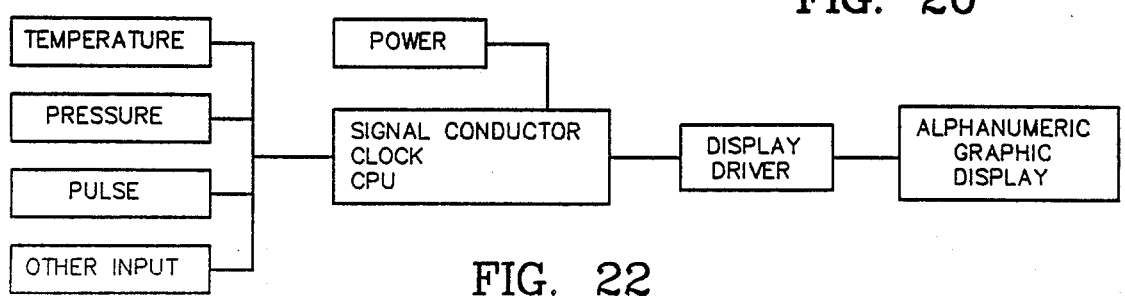
FIG. 22

4,932,765

OPTICAL DEVICE PROVIDING SUPPLEMENTAL WIDE ANGLE PERIPHERAL VISION

BACKGROUND OF THE INVENTION

This invention relates generally to improvements in optical devices. More particularly, the device is directed to a wide angle viewing device to be incorporated into headgear including eyeglasses protective masks or helmets or any other structures proximal to the user such as aircraft canopies and automobile glazing. It may be incorporated into any environment where a substantial increase in peripheral vision is desirable.

Human binocular vision is well suited for making detailed observations of the environment immediately in front of the viewer. Human peripheral vision while not as acute as foveal vision offers an expanded field of visual sensitivity. Typically human vision covers a field of nearly 200 degrees. Without assistive devices the remaining 160 degrees of visual environment (behind the viewer) can only be accessed by changing the orientation of one's head. Frequently headgear and structures proximal to the user occlude normal peripheral vision. For example adjacent structures (automobile roof pillars and aircraft structures), protective helmets (motorcycle, football), protective goggles (skiing, skin diving), even eyeglass structures typically reduce one's access to the peripheral visual environment.

This invention provides a means for overcoming these occlusions of the visual environment while providing supplemental peripheral and rearward vision. By utilizing two of the optical devices which are herein described, a user may easily access the full 360 degree visual environment. The intent is not to expand or modify the function of normal binocular vision but to supplement it with an extreme wide angle peripheral viewing system which can be positioned so as to minimally restrict normal human vision.

Non visual data about the immediate environment can be made more useful to an observer if such information is placed so that it can easily be visually accessed. For example measures of relative time, elapsed time, temperature, ambient pressure, magnetic orientation, observer pulse rate, or any other data can be accessed with the instant device. By using widely available display technologies such as light emitting diode and liquid crystal displays typically used in modern wrist watches, a variable transparent overlay of data may be achieved. Various "heads up displays" have been proposed. This invention facilitates the overlay of such information on the supplemental extended peripheral and rearward vision. This invention may also be used to relate such data to the user with or without the supplemental peripheral vision. Further by utilization of widely utilized visual display technologies such as liquid crystal display miniature television a completely flexible information presentation format is achieved.

SUMMARY AND OBJECTIVES OF THE INVENTION

A primary object of the present invention is to provide a new and useful device for accessing optical information not normally discernible with conventional human vision.

A further object contemplates providing a device which can be oriented adjacent a perceiver in various environments to display various kinds of information.

A further object contemplates providing an optical device formed from a diverging instrumentality at an extremity of an optical path remote from the viewer, means for orienting the optical path such that it is accessible to the viewer, with an instrumentality interposed in the optical path for enhancing that which is viewable at the site of the diverging instrumentality. A display other than, or in addition to, an enhanced field of view may be located at the diverging instrumentality for further data accessing.

Other and further objectives of this invention will be apparent from the following description.

BRIEF DESCRIPTION OF THE DRAWINGS

In the accompanying drawings to which reference is made in the instant specification and in which like reference characters are used to indicate like parts in the various views:

FIG. 17 is a top view of the optical components of the invention mounted on the adjacent structure of an automobile.

FIG. 18 is an isometric view of the graphic data overlay placed outboard from the diverging lens means.

FIG. 19 is a view of the visual data overlay as seen from the outermost diverging optical means looking outward.

FIG. 20 is a view of a flexible or raster LCD data overlay.

FIG. 21 is a view of an integrated visual data overlay.

FIG. 22 is a schematic of the electronic components required for an electronic LCD integrated visual data overlay.

PARTS LIST

PLANAR REFLECTING MEANS
CONVERGING LENS MEANS
DIVERGING LENS MEANS
VIEWER'S EYE
OPTICAL AXIS
OPTICALLY FLAT SURFACE
CONVERGING REFLECTIVE MEANS
PROTECTIVE GLASSES
ADJUSTABLE HOUSING FOR 16
TUBULAR SUPPORT MEANS
GRAPHIC DATA
DIGITAL TIMER INDICATOR
DIGITAL CLOCK INDICATOR
DEPTH GAUGE INDICATOR
PULSE METER INDICATOR
TEMPERATURE GAUGE INDICATOR
GAP
PHOTOVOLTAIC CELLS
"SNAP ON" GRAPHIC DATA OVERLAY
LIQUID CRYSTAL GRID DATA OVERLAY
FLAT TRANSPARENT WINDOW
VEHICLE BODY
SOLID CLEAR OPTICAL GRADE RESIN
VEHICLE SIDE WINDOW
PROTECTIVE FACE PLATE
VEHICLE DRIVER
POLARIZING FILTER
GLASS PLATE
LIQUID CRYSTAL MATERIAL
REFLECTIVE SURFACE
AMBIENT LIGHT SOURCE
LIGHT RAY BEING REFLECTED
LIGHT RAY BEING TRANSMITTED THROUGH PANEL
CONFIGURED ELECTRICALLY CONDUCTIVE FILM

DETAILED DESCRIPTION OF THE PREFERRED EMBODIMENT

FIGS. 1 through 11 depict various configurations of the supplemental wide angle viewing apparatus.

FIGS. 1 through 4 describe optical arrangements of the apparatus which present planar surfaces to the environment facilitating its operation in and between many different environments. For example the devices illustrated in FIGS. 1 through 4 could be used above or below water. When used under water, the device may be mounted inside or outside of a protective diving mask.

Figure 1:
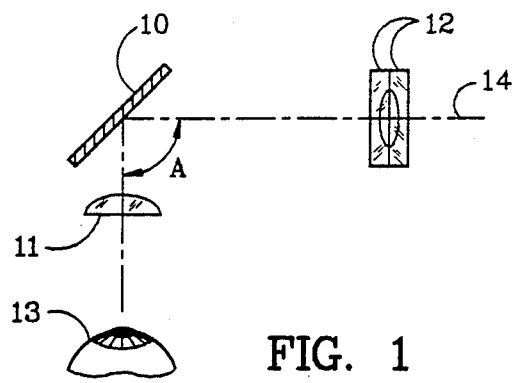
FIG. 1 is an optical path diagram of the invention showing the placement of various optical elements relative to the user's eye.

FIG. 1 illustrates a reflecting means 10 interposed between the converging lens 11 and diverging lens 12. The converging lens 11 has a curved surface remote from the eye of the viewer 13.

Figure 2:
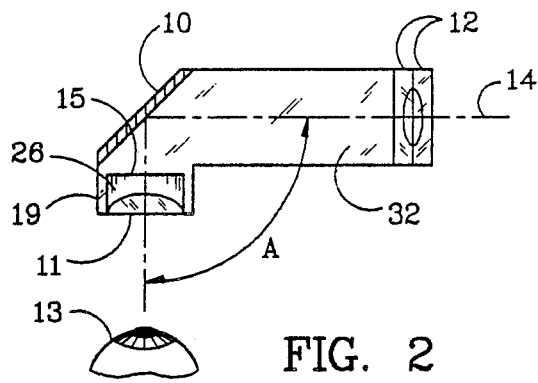
FIG. 2 is an optical path diagram showing the placement of various optical elements in a "thick lens" design utilizing an optically transparent resin.

FIG. 2 illustrates the same concept but as a solid optical component 32 where the converging lens element 11 is supported by a tube 19 so that a gap 26 is formed between the optical body 32 and the converging lens element 11. This space may be filled with a gas such as air or a liquid having an index of refraction different from its adjacent optical elements.

Figure 3:
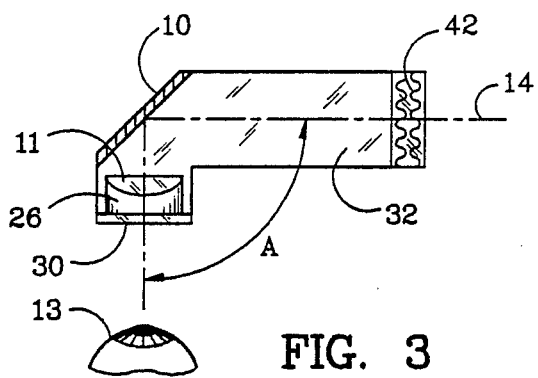
FIG. 3 is an optical path diagram showing the placement of various optical elements including fresnel diverging lenses, a solid optically transparent body portion, and a transparent window. This configuration works above and below the water.

FIG. 3 demonstrates a similar design wherein the diverging lens elements consist of fresnel lenses 42. In this embodiment the converging lens element 11 is covered with a transparent optically flat window 30. Note lens 11 is concave towards the viewer 13.

Figure 4:
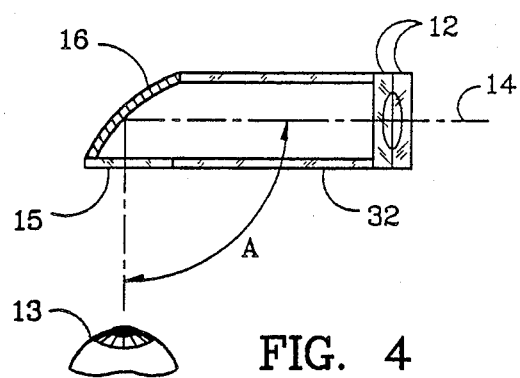
FIG. 4 is an optical path diagram showing use of a converging reflecting means.

In FIG. 4 the converging lens element and reflective means are replaced by a converging mirror 16.

FIGS. 5 through 11 depict various optical arrangements wherein the optical axis "alpha" is less than 90 degrees facilitating a peripheral view which is also substantially rearward. This type of arrangement is particularly useful in cases where the user desires to access the visual environment well behind his forward facing position.

Figure 5:
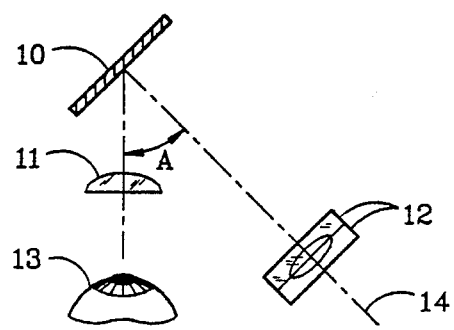
FIG. 5 is an optical path diagram showing the optical path at an acute angle to the normal line of sight. This configuration provides substantially rearward peripheral vision.

FIG. 5 depicts an arrangement similar to FIG. 1 wherein the angle "alpha" is less than 90 degrees.

Figure 6:
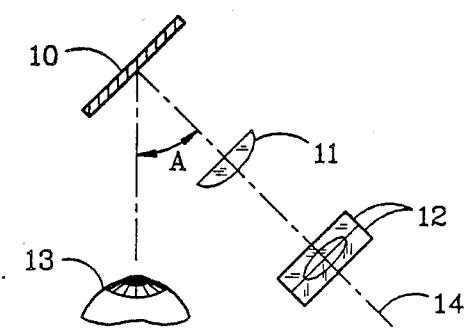
FIG. 6 is an optical path diagram showing the optical path at an acute angle with respect to the normal line of sight where the converging means is interposed between the diverging and reflecting means.

FIG. 6 depicts an optical arrangement where the converging lens 11 is placed between the reflecting means 10 and diverging means 12.

Figure 7:
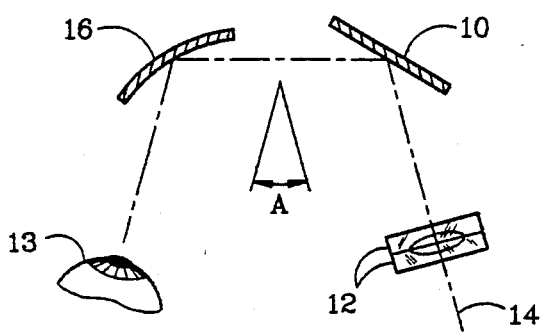
FIG. 7 is an optical path diagram of the invention where two reflecting means (10) are utilized. This configuration produces a right reading substantially rearward peripheral vision.
Figure 8:
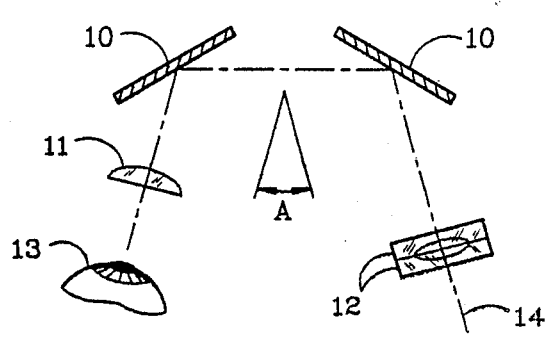
FIG. 8 is an optical path diagram of the invention where one planar reflecting means and one concave mirror are used to produce right reading substantially rearward peripheral vision.

Referring to FIG. 7 an additional reflecting means 10 has been added to give a substantially rearward viewing system. Inclusion of two reflecting surfaces additionally provides the user with a right reading optical system. FIG. 8 substitutes a converging reflecting surface 16 for the typical combination of a planar reflector and a converging lens.

In the remaining optical configurations a converging reflecting optical element 16 has been substituted for the typical planar reflector and converging lens design. Such converging reflective optical elements are readily available in the industry. Variations include on and off axis (concave) spherical and parabolic mirrors, as well as on and off axis fresnel mirrors. The reticulated surfaces of fresnel mirrors may be over coated with an optically transparent material in order to present a substantially smooth surface to the operating environment. Similarly the diverging lens means may also be on or off axis fresnel lenses 42 in FIGS. 11 and 14.

Figure 9:
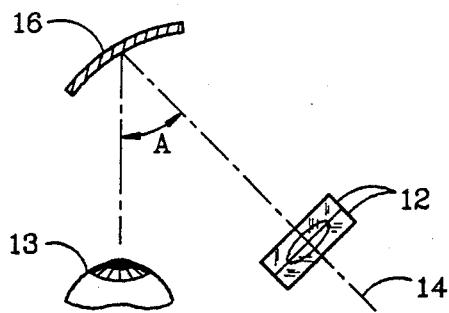
FIG. 9 is an optical path diagram of the invention where a converging reflective means replaces the combination of a planar reflecting means and a converging lens.
Figure 10:
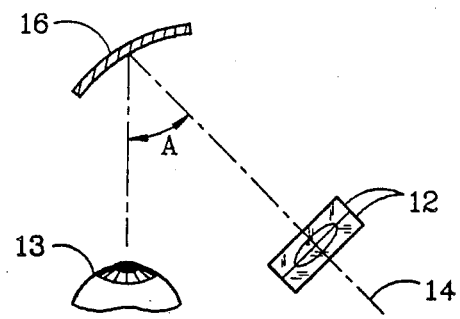
FIG. 10 is an optical path diagram of the invention where a transparent is interposed between the eye of the viewer and the converging reflecting means
Figure 11:
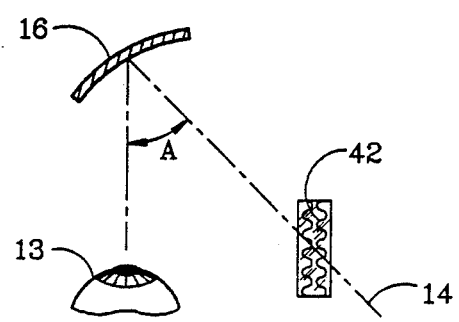
FIG. 11 is an optical path diagram where the diverging lens means consists of off axis fresnel lenses.
Figure 12:
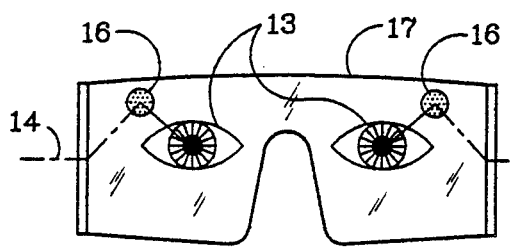
FIG. 12 is a front view of the optical components of the invention mounted on an article of headgear. The converging reflecting means are located above the user's eyes.
Figure 13:
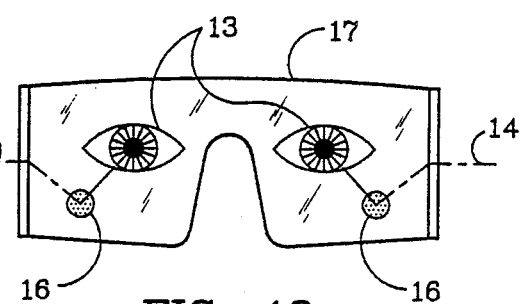
FIG. 13 is a front view of the optical components of the invention mounted on an article of headgear where the converging reflecting means are located below the user's eyes.

Referring now to FIG. 9 a concave mirror 16 replaces the planar reflecting surface and the converging lens element. In FIG. 10 a transparent window 30 is added in the optical pathway 14. Such a window might be required in a configuration using a hollow body to support the various optical elements. FIG. 11 uses a similar converging means 16 and an off axis fresnel 42 as the diverging lens means. FIG. 12 presents a view of the user's face and protective glasses 17 as a support means for the optical elements. In FIG. 12 converging reflecting means 16 is shown both above the user's eye. In FIG. 13 the converging reflecting means 16 is located below the user's line of sight. This concept is also depicted in side view in FIG. 14.

Figure 14:
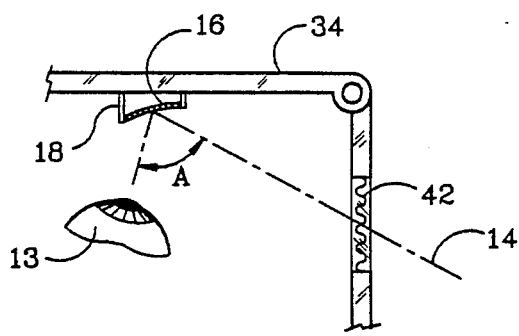
FIG. 14 is a top view of the optical components of the invention mounted on an article of headgear with the converging reflecting means mounted between the user's eye and the protective face plate and using off axis fresnel diverging lenses.
Figure 15:
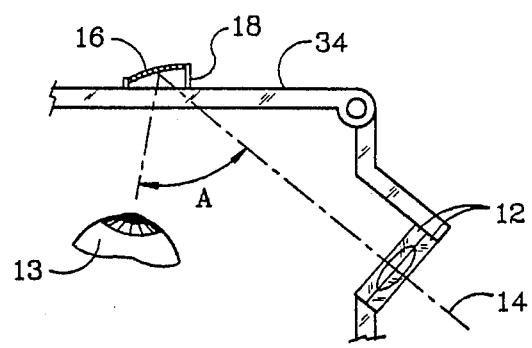
FIG. 15 is a top view of the optical components of the invention mounted on an article of headgear with the converging reflecting means located outboard of the protective face plate.

FIGS. 14 and 15 depict top views of the optical arrangement. In FIG. 14 the converging reflecting means 16 is mounted inboard of a protective face plate (34) and is mounted in an adjustable support housing 18. This view also depicts the use of off axis fresnel diverging elements 42. In each of these depictions element 16 is placed in an adjustable housing (18) facilitating individual positioning for variation in inter pupilar distances and preferred viewing angles.

Figure 16:
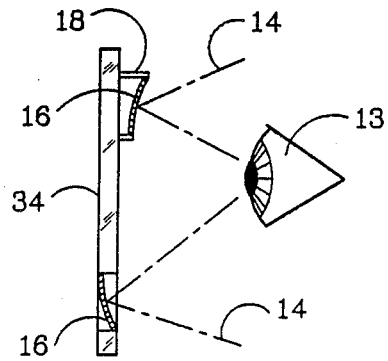
FIG. 16 is a side view showing the placement of the reflecting converging means within the protective face plate (lower) and inside the protective face plate.

FIG. 15 demonstrates an arrangement with normal diverging lens elements 12. However the converging reflecting means 16 is mounted outside of the protective face plate 34. A third possible placement of element 16 is portrayed in FIG. 16 where element 16 is actually placed within the protective face plate (as depicted in the lower position).

FIG. 17 illustrates the placement of the optical components of the invention mounted to various structural elements of an automobile. In this way the fresnel diverging means 42 could be mounted on or in the driver's window while the converging reflecting means 16 could be attached to the dash board.

FIG. 18 depicts the overlay of a graphic data display 20 in contact with or proximal to the outermost diverging lens element 12. The optical system described in FIGS. 1-17 has a virtually infinite depth of field. For this reason any graphic information placed in contact with or proximal to the outermost converging lens 12 will be in focus as is the visual environment behind it. In this way various graphic or physical data can be superimposed on the supplemental wide angle peripheral view.

FIG. 19 depicts one variation of such a visual display. Note that the display is shown as seen looking out from the outermost diverging lens element e.g. (12). From this perspective it appears inverted so that it would be right reading to the user of the optical device in any configuration using only one reflective means 10 or converging reflective means 16. This visual data display may use any one of several readily available graphic presentation technologies including but not limited to those familiar to electronic liquid crystal (LCD) wrist watches, LCD "pocket" televisions, mechanical gauges and various temperature and pressure sensitive materials such as direct reading (color change) liquid crystal temperature indicators. For example time functions 21 and 22 could be electronically generated and displayed in the format common to electronic LCD wrist watches. Pulse rate data 24 would also be processed and displayed this way. Depth or pressure data 23 could be presented electronically or be presented mechanically with the use of a closed end transparent tube design common to inexpensive depth gauges and barometers. Ambient temperature data 25 could be presented electronically or through the use of readily available temperature indicating liquid crystal material.

FIG. 20 demonstrates superimposition of a flexible "raster" type LCD 29 where the entire outermost converging lens element is covered with the matrix grid. Overlaying the outermost diverging lens element 12 with such a display achieves complete flexibility of data presentation. In this way not only could time, depth, pulse, temperature and associated data be easily accessible to the user, but other more complex visual information could also be displayed. Because LCDs in the power off mode are essentially transparent such displays could alternately made visible or invisible to the viewer.

FIG. 21 demonstrates an independent data display with a blind bore which frictionally overlies the outermost diverging lens element. This display includes an independent power supply photovoltaic means for recharging. Similar modules are also common to electronic wrist watches.

FIG. 22 is a block diagram describing a typical LCD product. Electronic watches, pulse meters, televisions, and "lap top" computers frequently use this type of LCD display. LCD watches often incorporate electronics necessary for determining the user's pulse, and ambient temperature as well as their usual time, calender and stop watch functions. In addition data may be transmitted to the LCD display from remote sensors. Typical transmission techniques might include "hard wired" types including conductive wire or fibre optics. Alternately data might be transmitted from remote sensors by means of pulsed light transmission, radio frequency wave transmission or sonic or ultra sonic wave transmission. By transmitting data from remote sensors additional important information could be visually displayed to the user. For example in the field of scuba equipment several manufacturers produce electronic LCD displays connected to the pressurized air cylinders. Data including tank pressure, remaining air, air consumption rate and other information such as no decompression dive limits are available to the user. Such data could easily be coupled with the LCD data overlay herein described.

Figure 23:
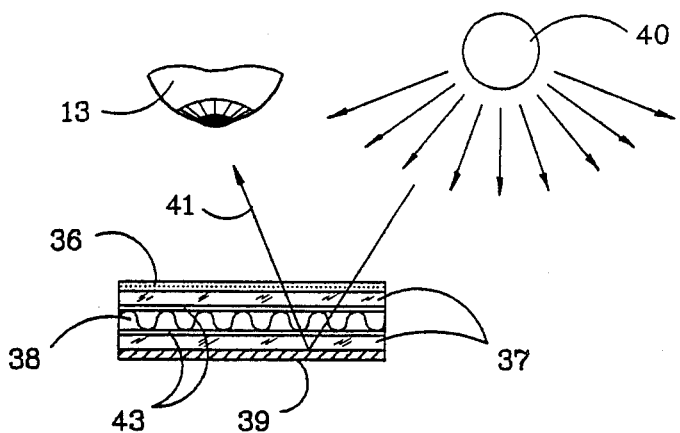
FIG. 23 is a section view through a typical reflected type LCD data display.

FIG. 23 is a section view of a typical LCD display. Most LCD displays operate as reflected light displays and have a reflective surface 39, located on the side opposite the polarizing filter 36. A transparent electrically conductive film 43 is deposited on the inner surface of the glass sandwich 37 which contains the liquid crystal material 38. Ambient light 41 is passed through the polarizing filter 36 passed or absorbed by the liquid crystal material 38. Light passing through the unenergized liquid crystal material 38 is reflected by reflective surface 39 and returned to the viewer's eye 13.

Figure 24:
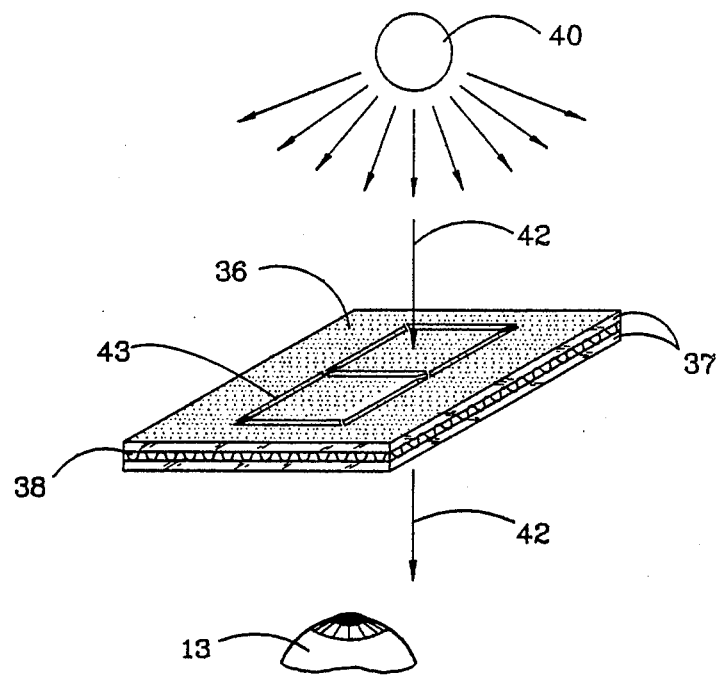
FIG. 24 is an isometric section view of a transmission type LCD data display.

FIG. 24 illustrates a fixed format transmitted light LCD display. In this application the reflective surface 39 is eliminated thereby facilitating a transmission of light 42 through the display. LCD displays may have a fixed or "raster" display format. Usually clocks and wrist watches have a fixed format display where conductive film segments 43 of alpha-numeric characters are activated or deactivated displaying graphic, letter, or number data or a combination of the three. In the fixed display format the graphic data presented is limited by the character pattern formed by transparent conductive film segments 43 located on the inner surfaces of the glass in which the liquid crystal material 38 is contained.

The data display could also consist of a combination of physically reactive sensors of the environment. For example the depth or pressure indicator could be a capillary tube which indicates ambient pressure by compression of a captured gas bubble such as is commonly used in barometers and inexpensive skin diving depth gauges. Temperature and pressure sensitive liquid crystals could be used to indicate temperature or pressure without intermediate electronic processing. Likewise a common "bubble level" might be used to translate inclination to the outermost diverging lens element. Similarly a common compass could be used to indicate magnetic orientation.

Having thus described the invention, it should be apparent that numerous structural modifications may be resorted to without departing from the spirit of the invention as discussed hereinabove and claimed hereinbelow.

I claim:

1. A means for accessing a wide angle of vision beyond a viewer's peripheral field, comprising in combination:

a diverging optical means oriented to address the wide angle of vision to be perceived by an eye of a viewer, reflective means interposed between the viewer's eye and said diverging optical means along an optical line of sight, allowing viewing through said diverging optical means, and converging optical means interposed between the eye and said diverging optical means along the optical line of sight, whereby a wide angle of vision beyond the viewer's peripheral field is accessed by the viewer, wherein said diverging optical means has outboard thereof graphic data display means oriented in said optical line of sight to transmit data to the viewer, wherein said graphic display means includes means to attach to said diverging optical means, said attaching means includes configuring said graphic display means has having a blind bore within which at least a portion of said diverging optical means resides and is supported.

2. The device of claim 1 wherein said reflective means and converging means are integral.

3. The device of claim 2 wherein said integral reflective and converging means is a fresnel mirror.

4. The device of claim 2 wherein said integral reflective and converging means is a concave mirror.

5. The device of claim 1 including means for altering indices of refraction along the optical path to accommodate contact in environments having diverse indices of refraction.

6. The device of claim 11 wherein said converging optical means has an arcuate surface with curved surface proximal to the viewer.

7. The device of claim 1 wherein said converging optical means has an arcuate surface with curved surface distal to the viewer.

8. The device of claim 6 wherein a transparent plate is interposed between said converging lens means and the viewer.

9. The device of claim 1 including an additional reflective means interposed in said optical path to further alter angulation of said optical path between, said diverging optical means and said viewer.

10. The device of claim 1 wherein said graphic display means is partially transparent to allow access to visual information therebeyond.

11. The device of claim 1 wherein said graphic display means is partially translucent to allow access to visual information thereon.

12. The device of claim 10 wherein said graphic display means reveals data through LCD technology.

* * * * *